United States Patent Office 3,828,085
Patented Aug. 6, 1974

---

3,828,085
NOVEL AMIDOAMINE OXIDES
Alson K. Price, Eggertsville, and Abraham N. Fenster, Getzville, N.Y., assignors to Allied Chemical Corporation, New York, N.Y.
No Drawing. Filed July 9, 1970, Ser. No. 53,705
Int. Cl. C07c *103/30*
U.S. Cl. 260—404.5   10 Claims

ABSTRACT OF THE DISCLOSURE

Amidoamine oxides of the formula $$R_fCON-RQ$$
$$\vert$$
$$Y$$

wherein $R_f$ is a perfluoroalkyl group or a polyfluoroisoalkoxyalkyl group; Y is hydrogen or a lower alkyl group; R is a lower alkylene radical or a direct bond between nitrogen and a carbon in Q and Q is selected from certain aliphatic cycloaliphatic and heterocyclic aromatic radicals containing an amine oxide group. These compounds are useful as surface active agents in liquid and solid fire-fighting compositions, in drug compositions suitable for injection into the blood stream of mammals, and in artificial blood compositions.

CROSS-REFERENCES TO RELATED APPLICATIONS

R. F. Sweeney et al., U.S. application Ser. No. 749,302, filed Aug. 1, 1968, entitled "Fluorinated Amides," now U.S. Pat. No. 3,600,415.

R. F. Sweeney et al., U.S. application Ser. No. 816,013, filed Apr. 14, 1969, entitled "Derivatives of Polyfluoroisoalkyloxyalkanamides."

L. G. Anello et al., U.S. application Ser. No. 818,832, filed Apr. 23, 1969, entitled "Polyfluoroisoalkoxyalkyl Halides."

L. G. Anello et al., U.S. application Ser. No. 721,113, filed Apr. 12, 1968, entitled "Terminally Unsaturated Fluoroolefins."

L. G. Anello et al., U.S. application Ser. No. 721,115, filed Apr. 12, 1968, entitled "Fluorocarbon Acids and Derivatives."

R. F. Sweeney et al., U.S. application Ser. No. 823,520, filed May 9, 1969, entitled "Quaternary Ammonium Compounds."

BACKGROUND OF THE INVENTION

A variety of organic surface active agents is known. However, relatively few of the different structural classes of such compounds are suitable surface active components for liquid foam and dry pulverulent solid compositions useful in fire-fighting applications wherein the surfactant-containing extinguishant is applied to the surface of a volatile organic liquid. In such applications, the surfactant-containing foam or powder provides a barrier layer between the atmosphere and the liquid fuel, thereby smothering the flames. However, many known organic surfactants provide liquid foam or powdered solid barrier layers which are incapable of preventing flashing, that is, reignition of the volatile combustible liquid in the event flammable conditions become reestablished in the area of the extinguishant-treated fuel, for example, by close approach of open flame to the treated area.

It is known also to employ organic surface active agents as intravenously injectable adjuvants for administering physiologically active organic compounds to mammals as is disclosed in British Pat. 1,083,825. Organic surfactants are also utilized in stabilizing aqueous emulsions of perfluorinated hydrocarbon oxygen and carbon dioxide transport agents useful as blood substitutes in mammals as disclosed in J. C. Norman Ed. "Organ Perfusion and Preservation," Appleton - Century - Crofts, N.Y., 1968, chapter 9. However, many organic surfactants are unsuitable for such uses since, on contact with mammalian blood, they cause hemolysis or other deleterious blood changes such as anisocytosis or hypochromia as disclosed in P. H. Elworthy et al., "Non-Ionic Surfactants," 1967, p. 948, section 28.7A; in C. Roze, C. R. Acad. Sci. Paris, Ser. D*263* (21) 1615 (1966); Chem. Abstrs. 66, 53478f (1966); and in Example 12 below. As is particularly evident from the aforementioned example, many different structural classes or fluorinated organic surface active agents produce the aforementioned undesirable deleterious changes.

Accordingly, it is a major object of this invention to provide a novel class of fluorinated amidoamine oxides useful as improved surface active agents.

SUMMARY OF THE INVENTION

The novel surfactant compound of the invention have the general formula:

$$R_fCON-RQ$$
$$\vert$$
$$Y \quad (I)$$

wherein $R_f$ is a perfluoroalkyl radical of 4 to 25 carbon atoms or a polyfluoroisoalkoxyalkyl radical of the formula:

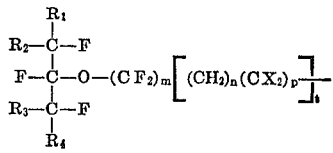

wherein $R_1$, $R_2$, $R_3$ and $R_4$ independently at each occurrence can be fluorine, chlorine, perfluoroalkyl of 1 to 9 carbon atoms or one of $R_1$ and $R_2$ and one of $R_3$ and $R_4$ are taken together to form a cyclic perfluoroalkylene group with the proviso that no more than two of the four $R_1$–$R_4$ groups are chlorine atoms and provided further that no more than two of the four $R_1$–$R_4$ groups are perfluoroalkyl groups; $m$ is an integer of 1 to 40; $n$, $p$ and $t$ are each integers of 0 to 20, the sum of $m$ and $t$ $(n+p)$ being 2 to 41, with the proviso that when $n$ is odd, $p$ is odd, and when $n$ is even, $p$ is even; X is hydrogen or fluorine;

Y is hydrogen or alkyl of 1 to 6 carbon atoms;

R is a straight or branched-chain alkylene radical of the formula:

$$-C_zH_{2z}-$$

wherein z is an integer of 1 to 6 or a covalent bond between nitrogen and a carbon atom in Q;

Q is (A) an aliphatic amine oxide radical of the formula:

wherein $R_5$ and $R_6$ are each alkyl radicals of 1 to 6 carbon atoms or hydroxy-terminated alkyl radicals of 2 to 6 carbon atoms, (B) a cycloaliphatic amine oxide radical of the formula:

wherein Z is a divalent radical of the formula:

$$-(CH_2)_4-,$$
$$-(CH_2)_5-, \text{ or}$$
$$-(CH_2)_2-O-(CH_2)_2-; \text{ or}$$

(C) an aromatic heterocyclic amine oxide radical selected from pyridyl N-oxide radicals and quinolyl N-oxide radicals;

with the proviso that when Q is the said aliphatic amine oxide radical or the said cycloaliphatic amine oxide radical, R is always the said alkylene radical.

The present novel nonionic amidoamine oxides are potent surface active agents. This is indicated by their ability to lower the surface tension of water by as much as about 70 to 80% when dissolved in water at concentrations as low as about 0.01 to 1.0 weight percent as is disclosed in Example 7 below.

Surprisingly, the present novel surfactants provide liquid foam and pulverulent solid fire-fighting compositions which not only smother the flames of burning volatile organic liquids such as gasoline and cyclohexane but further provide a barrier layer on such liquids which prevents sustained reignition of the combustible liquid on close approach of open flame as illustrated in Examples 8, 9, 10 and 11 below.

The present novel surfactants are also characterized by the unobvious property of producing no deleterious blood changes when contacted with mammalian blood. This inertness of mammalian blood toward the present fluorinated nonionic surfactants is particularly surprising in view of the hemolysis, hypochromia and/or anisocytosis or other changes produced by many nonionic surfactants and many different structural classes of polyfluorinated organic surfactants as indicated by the aforementioned reefrences of P. H. Elworthy and C. Roze and by Example 12 below. It will be appreciated by those skilled in the art that hemolysis and hypochromia are particularly deleterious effects since they involve loss of vital oxygen-carrying hemoglobin from red blood cells. The non-hemolytic property of the present amidoamine oxides make these novel compounds useful as the surface active stabilizers for aqueous emulsions of perfluorinated hydrocarbons utilized in artificial blood compositions as disclosed in the aforementioned Norman reference and as components of the injectable drug compositions described in aforementioned British Pat. 1,083,835.

The present amidoamine oxide compounds are prepared by reacting a fluoroalkanamide having a terminal radical containing a tertiary amine group with hydrogen peroxide, peracetic acid or ozone to convert the aforementioned tertiary amine group to the corresponding amine oxide group. The techniques employed in these reactions are conventional, being disclosed by A. C. Cope et al., J. Am. Chem. Soc. 71, 3929 (1949), 79, 964 (1957), A. Maggiolo et al., Adv. in Chem. Series No. 21, p. 202, and F. Guenther et al., U.S. Pat. 2,169,976. A particularly desirable method of preparing the present amidoamine oxides from the corresponding amido-substituted tertiary amines is to react the latter in alcoholic solution with 30 weight percent aqueous hydrogen peroxide as disclosed in aforementioned U.S. Pat. 2,169,976, the pertinent technology of which is incorporated herein by reference.

The fluoroalkanamido-tertiary amine starting materials referred to above have the structural formula:

$$R_fCONRT \atop Y \qquad (II)$$

wherein $R_f$, Y and R have the meanings given above and T represents a secondary or tertiary amine group-containing radical which can be

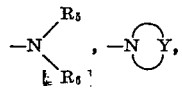

or a pyridyl or a quinolyl radical (which can contain conventional ring substituents such as bromine, chlorine or other halogen, lower alkyl, that is, alkyl of 1 to 6 carbon atoms such as methyl, ethyl, isopropyl, tert-butyl and n-hexyl or lower alkoxy); wherein $R_5$, $R_6$ and Y have the aforementioned meanings, R being an alkylene radical as defined above when T is

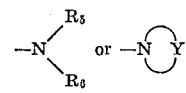

Such fluoroalkanamidoamines are either known compounds or can be prepared from known compounds by prior art reaction techniques or by reaction techniques disclosed in the copending U.S. applications referred to above. Suitable amidoamine starting materials for the present amine oxides are prepared by reaction of a diamine containing a primary amino or N-(lower-alkyl) secondary amino group and a tertiary amino group with a polyfluoroalkanoic acid of the formula:

$$R_fCOOH \qquad (III)$$

wherein $R_f$ has the meaning given above. The acid is desirably charged to the reaction as its ethyl or other lower alkyl ester. Representative suitable diamines for this reaction include the following typical examples:

3-(N,N-dimethylamino)propylamine
4-aminopyridine
2-(N,N-dimethylamino)ethylamine
2-aminomethyl pyridine
2-aminomethyl-6-(n-hexyl)pyridine
2-amino-5-diethylaminopentane
3-(4-methylaminobutyl)pyridine
2-(2-isopropylaminoethyl)pyridine
N,N,N-triethylethylenediamine
6-N,N-(di-n-propylamino)hexylamine
8-aminoquinoline
N-(4-aminobutyl)piperidine
8-amino-4-methoxyquinoline
2-amino-4-bromopyridine
N-(2-aminoethyl)morpholine
N-(2-aminoethyl)pyrrolidine
N-(2-aminoethyl)piperidine
3-(N,N-diethylamino)-2-methylpropylamine
3-(N,N-dihexylamino)propylamine
2,6-dichloro-4-aminomethylpyridine
8-isopropoxy-2-(2'-aminoethyl)quinoline
8-methyl-4-methylaminoquinoline
3-bromo-7-aminoquinoline
4-chloro-2-aminopyridine
2-chloro-3-aminopyridine
3-amino-2-chloroquinoline
3-[N,N-bis(2-hydroxyethyl)amino]propylamine
2-[N,N-bis(6-hydroxyhexyl)amino]ethylamine
8-hexylquinoline The reaction of these and equivalent diamines with acids of formula (III) to obtain fluoroalkanamido substituted tertiary amines of formula (II) is disclosed in greater detail in the copending U.S. application of R. F. Sweeney et al., Ser. No. 749,302, filed Aug. 1, 1968, entitled "Fluorinated Amides" and A. H. Albrecht, U.S. Pat. 2,764,603, the pertinent subject matter of which application and patent are incorporated herein by reference. Fluorinated alkanamidoamines of above formula (II) wherein R represents a methylene radical, that is $-CH_2-$, and T is

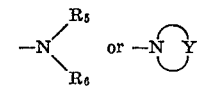

as defined above, are alternatively and desirably prepared from the polyfluoroalkanoic acid of formula (III) by esterifying the acid in conventional fashion with a lower alkanol, reacting the resultant lower alkyl ester with ammonia or a lower alkylamine such as methyl-, ethyl-, isopropyl- or n-hexylamine to form the corresponding amide, which is condensed with the N-methylol derivative of a secondary aliphatic or cycloaliphatic monoamine to form the desired fluoroalkanamido-substituted tertiary amine. Typical N-methylol secondary monoamines suitable for the latter reaction include the following representative examples:

dimethylmethylolamine    di-n-hexylmethylolamine
diethylmethylolamine     N-methylol-piperidine
di-isopropylmethylolamine N-methylol-pyrrolidine
methylethylmethylolamine N-methylol-morpholine
bis(2-hydroxyethyl)methylolamine The foregoing conversion of polyfluoroalkanoic acids of formula (III) to their corresponding amides is described in greater detail in Diesslin et al., U.S. Pat. 2,567,011 and the copending U.S. application of R. F. Sweeney et al. Ser. No. 816,013, filed Apr. 14, 1969, entitled "Derivatives of Polyfluoroisoalkoxyalkanamides," the pertinent subject matter of which is incorporated herein by reference. The reaction of the polyfluoroalkanamides and N-methylol- and secondary aliphatic or cycloaliphatic amines is carried out according to conventional procedures, for example, the techniques disclosed by Haussmann et al., German Pat. 873,551, and H. E. Zaugg et al., "Organic Reactions," 14 111 (1965), the pertinent subject matter of which is also incorporated herein by reference.

The polyfluoroalkanoic acids of formula (III) wherein $R_f$ is a perfluoroalkyl radical of 4 to 25 carbon atoms are derivatives of saturated straight- and branched-chain fatty acids of 5 to 26 carbon atoms in which all of the hydrogen substituents of carbon have been replaced by fluorine. These acids can be prepared from perfluoroalkyl iodides of the formula:

$$R_f\text{—}CF_2\text{—}I \qquad (IV)$$

wherein $R_f$ is perfluoroalkyl of 4 to 25 carbon atoms. The preparation of such acids is disclosed in Hauptschein et al. U.S. Pat. 3,238,240, the pertinent subject matter of which is hereby incorporated by reference. Perfluoroalkyl iodides of formula (IV) and the preparation thereof are disclosed in Hauptschein et al. U.S. Pat. 3,156,732 and Blanshard et al. U.S. Pat. 3,226,449, the pertinent subject matter of which is also incorporated herein by reference. Typical perfluoroalkylcarboxylic acids suitable for preparing the compounds of the invention include the following representative examples.

perfluoro-trimethylacetic acid
perfluoro-2,3-dimethylbutanoic acid
perfluoro-n-valeric acid
perfluoro-isovaleric acid
perfluoro-n-caproic acid
perfluoro-isocaproic acid
perfluorocaprylic acid
perfluorocapric acid
perfluoroundecylic acid
perfluorolauric acid
perfluoromyristic acid
perfluoropentadecylic acid
perfluoropalmitic acid
perfluorostearic acid
perfluorobehenic acid
perfluorolignoceric acid
perfluorocerotic acid as well as various chain-isomers of these and equivalent perfluoroalkanoic acids.

The carboxylic acids of formula (III) wherein $R_f$ is polyfluoroisoalkoxyalkyl which are employed as starting materials for the present amidoamine oxides have the formula:

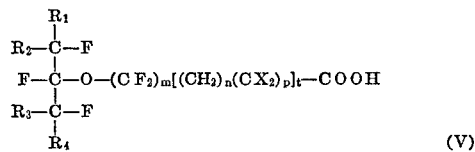

(V)

wherein $R_1$, $R_2$, $R_3$, $R_4$, X, m, n, p and t have the aforementioned meanings.

These polyfluoroisoalkoxyalkyl carboxylic acids are prepared by condensation, that is, telomerization of a telogen iodide of the formula:

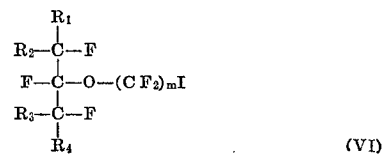

(VI)

wherein $R_1$, $R_2$, $R_3$, and $R_4$ have the meanings given above and m is 1 or 2, with up to 20 molar equivalents of an olefin selected from ethylene, tetrafluoroethylene and vinylidene fluoride and subsequent conversion of the resultant iodine-terminated telomer to a carboxylic acid of formula (V) as is disclosed in Anello et al. U.S. Pat. 3,514,487 and Anello et al. U.S. application Ser. No. 818,832, filed Apr. 23, 1969, entitled "Polyfluoroisoalkoxyalkyl Halides, the pertinent subject matter of which is incorporated herein by reference. Telogen iodides of formula (VI) wherein m is 2 are disclosed in Litt et al. U.S. Pat. 2,453,333 and Evans et al. U.S. Pat. 3,470,256. Telogen iodides of formula (VI) wherein m is 1 are prepared from the aforementioned telogen iodides of formula (VI) wherein m is 2 by liquid phase reaction with sulfur trioxide at 50–175° C. to replace the iodide substituent with the radical —COF, hydrolysis of the resultant acyl fluoride to the corresponding carboxylic acid, neutralization of the resultant carboxylic acid with alkali-free silver oxide and finally iodination of the resultant silver carboxylate to form the desired telogen iodide of formula (VI) wherein m is 1 as is set forth in greater detail in the aforementioned copending U.S. application of Anello et al. Ser. No. 818,832. The telomerization reaction of the aforementioned telogen iodides and the telomerizable olefin is effected in accordance with the procedure and reaction techniques disclosed in aforementioned U.S. Pat. 3,514,487. However, as is disclosed in the aforementioned U.S. application of Annello et al., Ser. No. 818,832, telomerization reactions involving vinylidene fluoride give two telomer products, namely a principal product wherein the alkyl residue of the telogen is attached to the methylene group in the telomer and the iodide residue of the telogen is attached to the difluoromethylene group in the telomer and a minor product wherein the alkyl residue of the telogen is attached to the difluoromethylene group in the telomer and the iodide residue is attached to the methylene group in the telomer, which products are readily separated by conventional techniques. Since only the former principal telomer iodide products are useful in preparing the carboxylic acids of formula (V), only these principal products are isolated from the vinylidene fluoride telomerizations of the aforementioned telogens.

The particular method by which specific telomer iodides are converted to a corresponding carboxylic acid of formula (V) will depend on the particular substitution in the saturated carbon chain joining the ether oxygen and the terminal iodide substituent of the telomer iodide. The particular synthetic methods for conversion of the telogen iodides to the desired carboxylic acids are also listed and discussed in aforementioned U.S. Pat. 3,514,487. In addition to the aforementioned synthetic techniques listed in U.S. Pat. 3,514,487, the following methods are useful in carboxylic acids of formula (V).

The telomer iodides of the aforementioned type which terminate in the group —$CF_2CF_2$—I can be converted to corresponding carboxylic acids of formula (V) by replacing the iodide substituent with the nitrile group, —CN, via reaction of the telomer iodide with cyanogen at 300–400° C. under 20–200 atmospheres pressure, followed by hydrolysis of the nitrile substituent at 90–110° C. with aqueous mineral acid such as sulfuric acid as disclosed in the copending U.S. application of Anello et al., Ser. No. 721,115, filed Apr. 12, 1968, entitled "Fluorocarbon Acids and Derivatives," the pertinent subject matter of which is herein incorporated by reference.

The telomer iodides of the aforementioned type which terminate in the group —$CH_2I$ can be converted to the carboxylic acids of formula (V) by reaction with aqueous alcoholic alkali metal cyanide to replace the terminal iodide substituent with the nitrile group, —CN, followed by hydrolysis of the nitrile substituent as disclosed in the aforementioned copending U.S. application Ser. No. 721,-115.

Telomer iodides of the aforementioned type which terminate in the group —$CH_2CF_2$—I can be converted to the carboxylic acids of formula (V) by conversion of said terminal group to the corresponding terminal olefin group —$CH=CF_2$ via base-catalyzed dehydroiodination at 25–150° C. (as disclosed in the copending U.S. application of Anello et al., Ser. No. 721,113, filed Apr. 12, 1968, entitled "Terminally Unsaturated Fluoroolefins," the pertinent subject matter of which is incorporated herein by reference) and subsequent aqueous alkali metal dichromate or permanganate oxidation of the terminal olefin group to the carboxylic acid group, as is disclosed in the aforementioned copending U.S. application Ser. No. 721,-115. Typical carboxylic acids of formula (V) which can be employed as starting materials for preparing the present amidoamine oxides include the following representative examples:

$(CF_3)_2CFO(CF_2)_6COOH$
$(CF_3)_2CFO(CF_2)_4COOH$
$(CF_3)_2CFO(CF_2)_2(CH_2)_2COOH$
$(CF_3)_2CFO(CF_2)_4(CH_2)_2COOH$
$(CF_3)_2CFO(CF_2)_6(CH_2)_2COOH$
$(CF_3)_2CFO(CF_2)_{16}COOH$
$(CF_3)_2CFO(CF_2)_8(CH_2)_{14}COOH$
$(CF_3)_2CFO(CF_2)_2(CH_2)_{10}COOH$
$(CF_3)_2CFO(CF_2)_2[(CH_2)_3(CF_2)_5]_3COOH$
$(CF_3)_2CFO(CF_2)_8(CH_2)_3COOH$
$(CF_3)_2CFO(CF_2)_8(CH_2)_{10}COOH$
$(CF_3)_2CFO(CF)_2CH_2COOH$
$(CF_3)_2CFO(CF)_2COOH$
$(CF_3)_2CFOCF_2CH_2COOH$
$(CF_3)_2CFO(CF_2)_5COOH$
$(CF_3)_2CFO(CF_2)_2(CH_2)_3COOH$
$(CF_3)_2CFO(CF_2)_3COOH$
$(CF_3)_2CFOCF_2[CH_2CF_2]_{20}COOH$
$(CF_3)_2CFOCF_2(CH_2)_2(CF_2)_{20}COOH$
$(CF_3)_2CFO(CF_2)_{20}(CH_2)_{20}COOH$
$(CF_3)_2CFO(CF_2)_8[(CH_2)_4(CF_2)_4]_4COOH$
$(CF_3)_2CFO(CF_2)_4[(CH_2)_2(CF_2)_3]_9COOH$
$(CF_3)_2CFO(CF_2)_3[(CH_2)_3(CF_2)_7]_3COOH$
$(CF_3)_2CFO(CF_2)_{17}[(CH_2)(CF_2)_3]_2COOH$

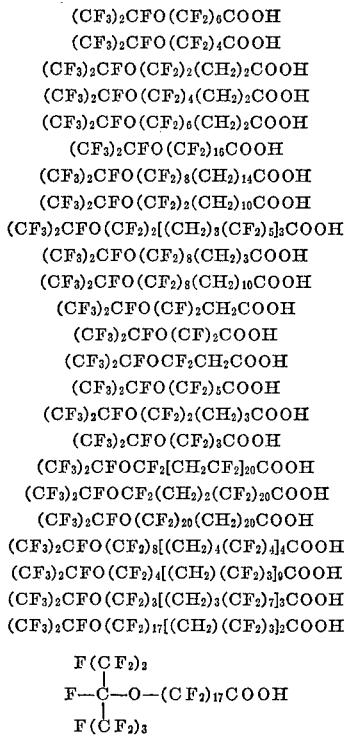

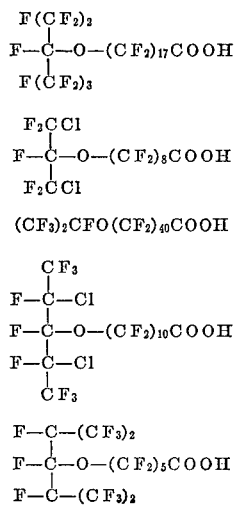

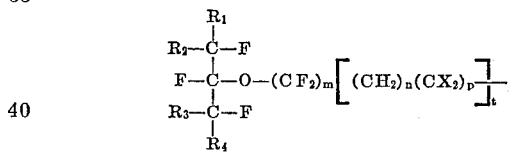

DESCRIPTION OF THE PREFERRED EMBODIMENTS OF THE INVENTION

In amidoamine oxides of the invention $R_f$ of the above general formula (I) is preferably a radical of the formula:

$$\begin{array}{c} R_1 \\ | \\ R_2-C-F \\ | \\ F-C-O-(CF_2)_m\left[(CH_2)_n(CX_2)_p\right]_t- \\ | \\ R_3-C-F \\ | \\ R_4 \end{array}$$

wherein $R_1$, $R_2$, $R_3$, $R_4$, X, m, n, p and t have the aforementioned meanings, with m being preferably 3 to 40 and the sum of m and t being preferably 3 to 41. Still preferably, $R_1$–$R_4$ are each fluorine or perfluoroalkyl groups of 1 to 6 carbon atoms, m is an integer 2 to 20 and n, p and t are each zero. Most preferably, $R_1$, $R_2$, $R_3$, and $R_4$ are fluorine and m is an integer from 3 to 10.

Y is preferably hydrogen in the present novel compounds.

Preferably R and Q of the general formula (I) are, respectively, the straight or branched chain alkylene radical, $C_zH_{2z}$, wherein z is an integer 2 to 6 and the aliphatic amide oxide radical,

wherein $R_5$ and $R_6$ are each alkyl radicals of 1 to 6 carbon atoms.

The present novel amidoamine oxides are nonionic fluorocarbon surface active agents which can be used in place of the ionic fluorocarbon surface active agents of Tuve et al., U.S. Pat. 3,258,423 and Sweeney et al. U.S. application Ser. No. 823,520, filed May 9, 1969, entitled "Quaternary Ammonium Compounds," to prepare the liquid foam fire extinguishants disclosed in the Tuve et al. patent and the dry pulverulent solid fire-extinguishants disclosed in the Sweeney et al. application, the pertinent subject matter of which patent and application is incorporated herein by reference.

Liquid foam fire-extinguishing agents of the present invention are prepared by blowing or mixing with air, carbon dioxide, nitrogen, low boiling fluorocarbons such as difluorodichloromethane, or other suitable nonflammable gaseous media, solution containing about 0.01 to 10 weight percent of one or more amidoamine oxides of the invention in a suitable aqueous solvent such as water, sea water, or aqueous lower aliphatic alcohol, for example, aqueous methanol or ethanol containing up to about 25 weight percent of the alcohol. Foam inprovers such as high molecular weight polymers of ethylene oxide, polyvinyl resins, polyglycols, carboxy vinyl polymers and the like of the type disclosed in the Tuve et al. patent can be charged in amounts of about 0.01 to 5% by weight of the amidoamine oxide solution. Amidoamine oxide-containing foam extinguishants of the present invention when applied to burning volatile organic liquid fuels such as gasoline, cyclohexane, naphtha, benzene and the like in accordance with the techniques of aforementioned U.S. Pat. 3,258,423 not only block feedback of radiant energy to the fuel surface but also prevent further release of flammable vapor after the flames have been suppressed. In the latter effect, the present foams extend their utility as extinguishants even after the gas bubbles of the foam begin to disintegrate, it is believed, by forming a thin film capable of spreading over the fuel-foam interface and fuel areas not fully covered by foam. This film which is quickly reformed whenever ruptured provides a seal between the fuel and the atmosphere. The sealant film which is impervious to the flammable fuel vapor prevents flashing or reignition of the fuel on close approach of open flame. The vapor sealant film-forming property of the present foams is similar to that possessed by the Tuve et al. foams, but is nevertheless highly surprising since the present surfactants are devoid of the ionic properties prescribed for suitable vapor sealant foam-forming surfactants by the Tuve et al. reference. The liquid foam fire extinguishing compositions of the invention are compatible with and conveniently employed in conjunction with dry powder fire-extinguishing compositions including the pulverulent fire-extinguishants hereafter described.

Dry pulverulent solid fire-fighting compositions are prepared from the present novel fluoroamidoamine oxides by intimately mixing the amidoamine oxide surfactant with a pulverulent non-combustible inorganic solid such as sodium bicarbonate, potassium bicarbonate, magnesium bicarbonate, ammonium sulfate, ammonium phosphate, calcium carbonate, mineral barytes, ammonium dihydrogen phosphates, or mixtures thereof with aluminum sulfate and/or aluminum chlorohydrate, conventionally employed as components of dry powder fire-extinguishants. Mixing may be accomplished, for example, by grinding the inorganic solid component and the amidoamine oxide in a ball mill or other suitable grinding apparatus. Alternatively and preferably, these materials may be intimately mixed by a procedure which comprises dissolving the amidoamine oxide in an inert volatile organic solvent such as methanol, acetone or acetonitrile, slurrying the pulverulent inorganic solid in the solution and finally evaporating the slurry to dryness, for example, at about 50–100° C. If desired, additional grinding may be employed to optimize the free-flowing characteristics of the powdered mixture. Coarse particles and fines can be removed, if desired, by passage of the mixture through screens of appropriate mesh size. Whatever mixing means is employed, the surfactant forms a continuous or semi-continuous adsorbed layer or coating on the inorganic powder surfaces.

The amount of the fluoroamidoamine oxide employed in the pulverulent solid extinguishant is not critical and will vary depending on the particular inorganic solid with which it is combined. The optimum amount can be determined by routine experimentation. Generally, the amidoamine oxide should be employed in at least about 0.01% and advantageously about 0.1 to 1.0% by weight of the powdered extinguishant composition. For practical reasons, nothing is to be gained by using powdered extinguishant compositions containing more than about 5.0% of the amidoamine oxide surfactant.

Fires in combustible volatile organic fuels of the type discussed above can be extinguished with the present surfactant-containing inorganic powders by spreading or spraying the extinguishant compositions on the burning fuel surface from conventional applicators pressurized with compressed air or carbon dioxide.

In the foregoing dry powder fire extinguishing application, the present novel surfactants are found to effect one or more of the following results (a) they enhance the fire extinguishing capability of the inorganic powder with which it is combined, (b) they promote the free-flowability of the inorganic solid component, (c) they increase the compatibility of the inorganic powder with other fire extinguishing agents and most significantly (d) they serve to prevent reignition of the fuel in the event flammable conditions become reestablished in the area of the extinguishant-treated fuel. It is theorized that the aforementioned layer of surfacant on the inorganic powder surfaces is desorbed from the inorganic solid during fire-fighting and forms a vapor-sealant film on the surface of the fuel analogous to the film believed formed in application of the liquid foam extinguishants of the invention. As discussed above, the vapor sealant film surprisingly formed by the nonionic surfactants of the invention serves to cover the surface of the liquid fuel and thereby prevents reignition of the fuel if flammable conditions become reestablished.

Unlike many known organic surfactants, the present amidoamine oxide surfactants cause no deleterious changes in mammalian blood and hence can be employed in veterinary medicine as intravenously injectable adjuvants for administering physiologically active organic compounds to mammals as discussed in British Pat. 1,083,825, the pertinent subject matter of which is incorporated herein by reference. In this mode of application, one or more of the present novel surfactants are injected into the blood stream of a dog or other mammal in a sterile composition comprising: (1) a liquid carrier such as sesame oil, peanut oil, propylene glycol, N,N-dimethyl formamide or aqueous solutions such as Ringer's solution, which have been buffered, if necessary, and rendered isotonic by addition of glucose or saline; (2) a parenterally administrable physiologically active organic compound such as bamboo curare, pot curare, calabash curare, lidocaine, serotonin and digitoxin; and (3) from about 0.01 to 10 percent of the present surfactant based on the weight of the drug.

The present non-hemolytic amidoamine oxides can also be used in place of known polyoxyethylene-polyoxypropylene-polyol emulsifiers to stabilize aqueous emulsions of perfluorinated hydrocarbon oxygen and carbon dioxide transport agents of the type disclosed in the aforementioned J. C. Norman reference. Such emulsions can be employed as artificial blood in replacing part or all of the blood supply of living mammals such as rats or in extra corporeal perfusion of excised organs of such mammals.

In the following examples which serve to illustrate our invention, parts percentages and proportions are by weight unless otherwise noted and temperatures are in degrees centigrade.

EXAMPLE 1

A mixture of 10 parts (0.02 mol) of an amide of the formula:

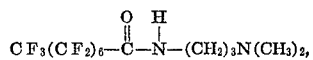

3.5 parts of 30% aqueous hydrogen peroxide (containing about 1.05 parts, 0.031 mol hydrogen peroxide) and 7.92 parts methyl alcohol is agitated for about 60 hours at ambient temperature. After addition of 7.92 parts methyl alcohol, about 0.005 part of platinum dioxide and about 5 parts of water, the reaction mass is agitated at ambient temperature for about 4 hours to destroy residual hydrogen peroxide. The mass is filtered, and the solid residue which is collected is washed with about 10 parts of water and discarded. The filtrate and washings are combined and evaporated to dryness at ambient temperature. The product is further dried *in vacuo* at ambient temperature for about 16 hours and at about 56° C. for about 16 hours.

There is thus obtained 6.1 parts (58% yield of theory) of amine oxide product of melting point 61–63° C. having the structural formula:

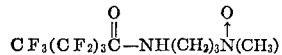

Elemental analysis calculated for $C_{13}H_{13}F_{15}N_2O_2$: C, 30.37; H, 2.55; F, 55.42; N, 5.45. Found: C, 30.26; H, 2.70; F, 53.63; N, 5.45.

The infrared and nuclear magnetic resonance spectra of the product are consistent with the above structural formula.

EXAMPLE 2

The procedure of Example 1 is repeated substantially as described in treating 93 parts (0.2 mol) of an amide of the structural formula:

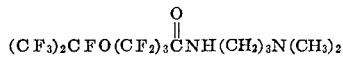

with 37 parts of 30% aqueous hydrogen peroxide (containing 11.1 parts, 0.326 mol of hydrogen peroxide) in 19.8 parts of methyl alcohol. There is obtained 93 parts (97% yield of theory) of amine oxide product, melting point, 94–96° C., having the structural formula:

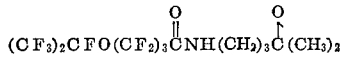

Elemental analysis calculated for $C_{12}H_{13}F_{13}N_2O_3$: C, 30.04; H, 2.73; F, 51.43; N, 5.83. Found: C, 29.38; H, 2.78; F, 50.07; N, 5.65.

EXAMPLE 3

The procedure of Example 1 is repeated substantially as described in treating 22.6 parts (0.039 mol) of an amide of the structural formula:

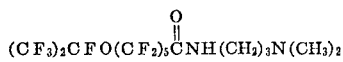

with 7 parts of 30% aqueous hydrogen peroxide (containing 2.1 parts, 0.062 mol hydrogen peroxide) in 35.2 parts of methyl alcohol. There is obtained 18 parts (80% yield of theory) of amine oxide product. There is thus obtained 18 parts (80% yield of theory) of a solid amine oxide having the structural formula:

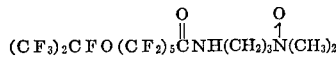

Elemental analysis calculated for: $C_{14}H_{13}F_{17}N_2O_3$: C, 28.98; H, 2.26; F, 55.66; N, 4.83. Found: C, 28.65; H, 2.35; F, 55.53; N, 4.79.

EXAMPLE 4

The procedure of Example 1 is repeated substantially as described in treating 13.3 parts (0.02 mol) of an amide of the structural formula:

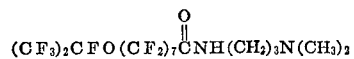

with 4.5 parts of 30% aqueous hydrogen peroxide (containing 1.35 parts, 0.04 mol of hydrogen peroxide) in 47.4 parts of methyl alcohol. There is thus obtained 13.0 parts (95% yield of theory) of a solid amine oxide having the structural formula:

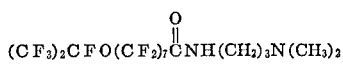

Elemental anaylsis calculated for $C_{16}H_{13}F_{21}N_2O_3$: C, 28.25; H, 1.93; F, 58.65; N, 4.12. Found: C, 28.21; H, 2.07; F, 58.58; N, 4.01.

EXAMPLE 5

The procedure of Example 1 is repeated substantially as described in treating 21.5 parts (0.0375 mol) of an amide of the structural formula:

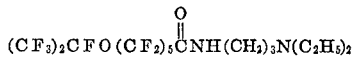

with 11 parts of 30% aqueous hydrogen peroxide (containing 3.3 parts, 0.097 mol of hydrogen peroxide) in 23.8 parts of methyl alcohol. There is thus obtained 11 parts (48% yield of theory) of solid amine oxide having the structural formula:

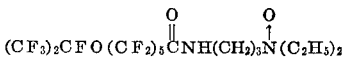

Elemental analysis calculated for: $C_{16}H_{17}F_{17}O_3N_2$: C, 31.59; H, 2.82; F, 53.09; N, 4.61. Found: C, 31.42; H, 2.84; F, 53.24; N, 4.53.

EXAMPLE 6

The procedure of Example 1 is repeated substantially as described in treating 16.0 parts (0.018 mol) of an amide of the structural formula:

with 5 parts of 30% aqueous hydrogen peroxide (containing 1.5 parts, 0.044 mol of hydrogen peroxide) in 23.8 parts methyl alcohol. There is thus obtained 16 parts (97% yield of theory) of a solid amine oxide of the structural formula:

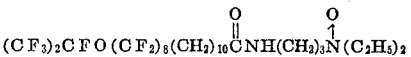

Elemental analysis calculated for $C_{29}H_{37}F_{23}N_2O_3$: C, 38.77; H, 4.15; F, 48.62; N, 3.12. Found: C, 38.22; H, 4.45; F, 47.94; N, 3.25.

EXAMPLE 7

Amine oxides of the invention are tested as surface-active agents by dissolving the compounds in water and measuring the surface tension of the resultant solutions at 25° C. according to ASTM Test D 1131–156 using a du Nouy tensiometer. The surface tension of water at 25° C. is 72 dynes/cm. The results are given in Table I below wherein surface tension is expressed in dynes/cm.

TABLE I

| Compound | Concentration, percent | Surface tension |
|---|---|---|
| $(CF_3)_2CFO(CF_2)_5\overset{O}{\overset{\|}{C}}NH(CH_2)_3\overset{O}{\overset{\uparrow}{N}}(CH_3)_2$ (amine oxide of Example 3) | 1.00<br>0.50 | 16.4<br>16.6 |
| $(CF_3)_2CFO(CF_2)_3\overset{O}{\overset{\|}{C}}NH(CH_2)_3\overset{O}{\overset{\uparrow}{N}}(CH_3)_2$ (amine oxide of Example 2) | 1.00<br>0.50 | 18.9<br>17.8 |
| $(CF_3)_2CFO(CF_2)_5\overset{O}{\overset{\|}{C}}NH(CH_2)_3\overset{O}{\overset{\uparrow}{N}}(C_2H_5)_2$ (amine oxide of Example 5) | 1.00<br>0.50<br>0.10<br>0.01 | 14.9<br>15.1<br>15.1<br>21.9 |
| $CF_3(CF_2)_6\overset{O}{\overset{\|}{C}}NH(CH_2)_3\overset{O}{\overset{\uparrow}{N}}(CH_3)_2$ (amine oxide of Example 1) | 1.00<br>0.50 | 17.0<br>18.1 |

The surface tension of these solutions compared to that of water is indicative of the efficacy of these compounds as surface-active agents.

The following Examples 8, 9, 10 and 11 illustrate the application of the present novel amine oxides in fire fighting. Examples 8 and 9 illustrate the efficacy of these compounds as the surfactant components of liquid foam fire-fighting compositions. Examples 10 and 11 illustrate the efficacy of these compounds as the surfactant components of pulverulent solid fire-fighting compositions.

EXAMPLE 8

Two ignition tests similar to that of U.S. Navy, Military Specification, Fire Extinguishing Agent MIL–F–24385, 4.7.7–4.7.7.2.1 are employed to determine the ability of foams of aqueous solutions of the present amine oxides to develop a vapor-sealing film on a hydrocarbon fuel surface and thereby prevent sustained ignition of the fuel.

3 parts by volume of a 1% aqueous solution of the amine oxide in either water or water-methanol mixture is whipped to an air foam by agitation for 10 seconds in a Waring Blender operated at the slow speed. The resultant aqueous amine oxide foam on being charged to 9 parts by volume of cyclohexane in a shallow dish (2 inches diameter, 1 inch depth) forms a film on the surface of the hydrocarbon. In the first test, an open flame is placed 0.5 inch above the surface of the foam-hydrocarbon mixture for 60 seconds and any ignition is noted. In the second test, the foam film is broken manually, and restored by gentle agitation of the mixture, before placement for 30 seconds of the open flame as previously described. The results of these tests are presented in Table II below.

EXAMPLE 10

About 0.5 parts of an amine oxide having the structural formula:

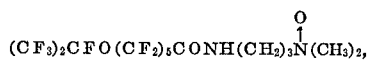

that is, the amine oxide of Example 3, is dissolved in about 15.8 parts of methyl alcohol, intimately mixed with about 10 parts of sodium bicarbonate, evaporated to dryness by heating at 80° C. for about 16 hours and ground to a fine powder. About 2 parts of the powder is sifted through a 250 mesh screen to cover the surface of about 9 parts by volume cyclohexane in a shallow dish of the type described in Example 8. An open flame is placed about 0.5 inch above the dish for 15 seconds without igniting the cyclohexane. The powder surface is broken and allowed to reform by standing for about one minute. The flame is placed about 0.5 inch above the dish for about 15 seconds. No flash or sustained ignition of the cyclohexane occurs.

TABLE II

| Foam charged— | | Ignition test | |
| --- | --- | --- | --- |
| Amine oxide | Aqueous solvent | 1 | 2 |
| $(CF_3)_2CFO(CF_2)_6CONH(CH_2)_3\overset{O}{\underset{\uparrow}{N}}(CH_3)_2$ (amine oxide of Example 3) | 4:1 by volume mixture of water and methyl-alcohol. | No flash or sustained ignition. | No flash or sustained ignition. |
| $(CF_3)_2CFO(CF_2)_7CONH(CH_2)_3\overset{O}{\underset{\uparrow}{N}}(CH_3)_2$ (amine oxide of Example 7) | 9:1 by volume mixture of water and methyl-alcohol. | do | Do. |
| $(CF_3)_3CFO(CF_2)_3CONH(CH_2)_3\overset{O}{\underset{\uparrow}{N}}(CH_3)_2$ (amine oxide of Example 2) | Water | do | Do. |
| $CF_3(CF_2)_6CONH(CH_2)_3\overset{O}{\underset{\uparrow}{N}}(CH_3)_2$ | do | do | Do. |
| None | | Immediate ignition of cyclohexane. | |

EXAMPLE 9

A mixture of 0.23 parts of the amidoamine oxide of Example 2, 0.23 parts of the amidoamine oxide of Example 3, 0.23 parts of the amidoamine oxide of Example 7, and 0.69 parts of a water-soluble ethylene oxide polymer ("Polyox WSR–35," Union Carbide Chemical Co.) is dissolved in 48.63 parts of water at ambient temperature. About 12 parts of the resultant solution is diluted by addition of 88 parts of water and whipped to an air foam substantially as described in Example 8. About 34 parts of the resultant foam which has a volume per part by weight 3 to 4 times that of the unfoamed solution is poured evenly over the surface of 250 parts by volume of gasoline in a ten-inch diameter Pyrex pie plate which has been ignited 5 seconds prior to the addition of the foam. The foam immediately extinguishes the fire. A 50 mm. diameter crystallization dish containing 30 parts by volume of gasoline is then placed in the center of the plate and ignited. The time required for the flames to spread to 25% of the surface of the gasoline in the plate is about 6 minutes as measured from the time of ignition of gasoline in the center dish. The foregoing slow reignition of the foam-covered gasoline is indicative of the excellent stability and vapor-sealant capability of the foam.

EXAMPLE 11

Pulverulent solid mixtures consisting of 0.1% of the amine oxide having the structural formula:

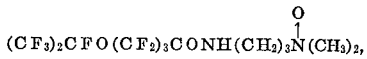

that is, the amine oxide of Example 2, and ammonium dihydrogen phosphate containing about 1% aluminum sulfate hydrate or ammonium dihydrogen phosphate containing about 1% of aluminum chlorohydrate are prepared substantially as described in Example 9, except that acetone is employed in place of methyl alcohol and evaporation to dryness is effected by heating at 50° C. for 3 hours. Two parts of each mixture is sifted through a 325 mesh screen to cover the surface of 10 parts by volume of cyclohexane in a dish of the type described in Example 8. An open flame is placed about 0.5 inch above the surface of the dish for about 30 seconds and any ignition is noted. Ignition in this manner is attempted after 10 minutes and again after 30 minutes. The results of these experiments are set forth in Table III below.

cell count, hemotocrit and sedimentation rate and is devoid of atypical cells. The blood is washed with normal

TABLE III

| Pulverulent solid | Ignition test | | |
|---|---|---|---|
| | 1 | 2 | 3 |
| Ammonium dihydrogen phosphate containing about 1% of aluminum sulfate hydrate and 1% of: $(CF_3)_2CFO(CF_2)_3CONH(CH_2)_3\overset{O}{N}(CH_3)_2$ | Momentary flash, but no sustained ignition of the cyclohexane. | No flash, or sustained ignition. | No flash or sustained ignition. |
| Ammonium dihydrogen phosphate containing about 1% of aluminum chlorohydrate and 1% of: $(CF_3)_2CFO(CF_2)_3CONH(CH_2)_3\overset{O}{N}(CH_3)_2$ | ....do........................ | ....do...................... | Do. |

The results of the foregoing Examples 8, 9, 10 and 11 illustrate that liquid foams and pulverulent inorganic solids containing the present novel surfactants provide vapor-sealant films on the surface of flammable volatile liquids and hence are effective fire-fighting compositions.

The following Example 12 illustrates non-hemolysis of blood on in vitro contact with the novel amine oxides of the invention.

EXAMPLE 12

A number of fluorinated surfactants are tested for deleterious effects on mammalian red blood in vitro according to a procedure similar to the "Quantitative Osmotic Fragility Test" in Todd-Sanford," Clinical Diagnosis by Laboratory Methods," W. B. Saunders Co., New York, N.Y., Thirteenth Edition, 1962, pp. 97–98.

In each test, 0.1 part by volume of blood is charged to a series of eleventh test tubes containing decreasing volumes of 2% aqueous solution of the surfactant and increasing volumes of Ringer's Solution and to a twelfth tube containing 2 parts by volume of Ringer's Solution, but no aqueous surfactant. The blood employed in the test is taken by venipuncture from a mammalian subject having no hemolytic disease. The blood which contains 14.7% hemolglobin according to the "Sahli-Hellige Test" of Todd-Sanford op. cit. p. 71, has a normal white blood saline solution four times prior to being charged to the testing solutions. After addition of the blood sample, the test mixtures are maintained at ambient temperature and observed every hour for hemolysis for a period of five hours. The results of these tests are given in Table IV below wherein test mixtures exhibiting hemolysis are indicated by a positive sign and test mixtures devoid of hemolysis are indicated by a minus sign. In the case of surfactants which caused no hemolysis, the surfactant-treated blood samples were examined by oil immersion microscopy to detect any other changes in the blood.

TABLE IV

| Test tube number | 1 | 2 | 3 | 4 | 5 | 6 | 7 | 8 | 9 | 10 | 11 | 12(control) |
|---|---|---|---|---|---|---|---|---|---|---|---|---|
| Parts by volume, 2% aqueous surfactant | 2.0 | 1.9 | 1.8 | 1.7 | 1.6 | 1.5 | 1.4 | 1.3 | 1.2 | 1.1 | 1.0 | 0 |
| Parts by volume, Ringer's solution | 0 | 0.1 | 0.2 | 0.3 | 0.4 | 0.5 | 0.6 | 0.7 | 0.8 | 0.9 | 1.0 | 2.0 |
| Fluorinated surfactant: | | | | | | | | | | | | |
| $(CF_3)_2CFO(CF_2)_3CONH(CH_2)_{10}\overset{CH_2CH_2COO^{\ominus}}{\underset{\oplus}{N}}(CH_2CH_3)_2$ | + | + | + | + | − | − | − | − | − | − | − | − |
| $(CF_3)_2CFO(CF_2)_3CONHCH_2COONH_4$ | + | + | + | + | + | + | + | + | + | + | + | −* |
| $(CF_3)_2CFO(CF_2)_3(CH_2)_{\oplus_2}N{\langle}C_6H_5{\rangle}I^{\ominus}$ | + | + | + | + | + | + | + | + | + | + | | − |
| $(CF_3)_2CFO(CF_2)_3CONH(CH_2)_3\overset{CH_2CH_2COO^{\ominus}}{\underset{\oplus}{N}}(CH_3)_2$ | + | + | + | + | − | − | − | − | − | − | − | − |
| $\left[(CF_3)_2CFO(CF_2)_3CONH(CH_2)_{10}\overset{CH_2COOH}{\underset{\oplus}{N}}(CH_3)_2\right]Cl^{\ominus}$ | + | + | + | + | + | + | + | + | + | + | + | − |
| $[(CF_3)_2CFO(CF_2)_3(CH_2)_2O]_2PO_2NH_4$ | + | + | + | + | + | + | + | + | + | + | | − |
| $(CF_3)_2CFO(CF_2)_3COONa$ | + | + | + | + | + | + | + | + | + | + | | −* |
| $\left[(CF_3)_2CFO(CF_2)_3(CH_2)_2C{\langle}\overset{NH_2}{\underset{NH_2}{\phantom{X}}}{\rangle}\right]^{\oplus}I^{\ominus}$ | + | + | + | + | − | − | − | − | − | − | − | − |
| $\left[(CF_3)_2CFO(CF_2)_3CONH(CH_2)_3\overset{CH_3}{\underset{\oplus}{N}}(CH_2CH_3)_2\right]I^{\ominus}$ | − | − | − | − | − | − | − | − | − | − | − | −** |
| Amine oxide of Example 2 | − | − | − | − | − | − | − | − | − | − | − | −*** |

+ = Hemolysis.  − = No hemolysis.
*Showed hemolysis immediately upon addition of the blood sample. All other positive test samples required 1 to 2 hours to exhibit hemolysis.
**Examination of the surfactant-treated blood samples by oil immersion microscopy revealed anisocytosis and hypochromia in the enlarged red blood.
***No changes in the surfactant-treated blood samples compared to untreated blood were revealed by oil immersion microscopy:

The foregoing test results illustrate that aqueous solutions of the present novel amine oxides on contact with blood neither causes hemolysis or produce other undesirable blood changes such as anisocytosis or hypochromia.

EXAMPLES 13–66

Additional illustrative fluorinated amidoamine oxides of the present invention having the abovementioned surface-active properties are listed in Table V below. These novel compounds are prepared by reaction of the corresponding fluorinated amidoamine with hydrogen peroxide in a manner analogous to that described in Example 1 above.

TABLE V

| Example | Amidoamine Reactant | Amidoamine Oxide Product |
|---|---|---|
| 13 | $(CF_3)_2CFO(CF_2)_7CONH(CH_2)_2N(CH_3)_2$ | → $(CF_3)_2CFO(CF_2)_7CONH(CH_2)_2\overset{\downarrow}{N}(CH_3)_2$ with O |
| 14 | $(CF_3)_2CFO(CF_2)_5CONHCH_2CH_2$-(pyridyl) | → $(CF_3)_2CFO(CF_2)_5CONHCH_2CH_2$-(pyridyl N-oxide) |
| 15 | $(CF_3)_2CFO(CF_2)_3CONH(CH_2)_3N(C_2H_5)_2$ | → $(CF_3)_2CFO(CF_2)_3CONH(CH_2)_3\overset{\downarrow O}{N}(C_2H_5)_2$ |
| 16 | $(CF_3)_2CFO(CF_2)_2(CH_2)_2CONH(CH_2)_2N(CH_3)(C_3H_7)$ | → $(CF_3)_2CFO(CF_2)_2(CH_2)_2CONH(CH_2)_2\overset{\downarrow O}{N}(CH_3)(C_3H_7)$ |
| 17 | $(CF_3)_2CFO(CF_2)_4(CH_2)_5CON(CH_3)(CH_2)_4N(C_6H_{13})_2$ | → $(CF_3)_2CFO(CF_2)_4(CH_2)_5CON(CH_3)(CH_2)_4\overset{\downarrow O}{N}(C_6H_{13})_2$ |
| 18 | $(CF_3)_2CFO(CF_2)_2CH_2CONH(CH_2)_6N(CH_3)_2$ | → $(CF_3)_2CFO(CF_2)_2CH_2CONH(CH_2)_6\overset{\downarrow O}{N}(CH_3)_2$ |
| 19 | $(CF_3)_2CFO(CF_2)_5CONH(CH_2)_4$-(pyridyl) | → $(CF_3)_2CFO(CF_2)_5CONH(CH_2)_4$-(pyridyl N-oxide) |
| 20 | $(CF_3)_2CFO(CF_2)_5CONHCH_2$-(2-methylpyridyl) | → $(CF_3)_2CFO(CF_2)_5CONHCH_2$-(2-methylpyridyl N-oxide) |
| 21 | $(CF_3)_2CFO(CF_2)_5CON(C_6H_{13})(CH_2)_4N[(CH_2)_2OH]_2$ | → $(CF_3)_2CFO(CF_2)_5CON(C_6H_{13})(CH_2)_4\overset{\downarrow O}{N}[(CH_2)_2OH]_2$ |
| 22 | $(CF_3)_2CCONH$-(pyridyl) | → $(CF_3)_2CCONH$-(pyridyl N-oxide) |
| 23 | $(CF_3)_2CFCF(CF_3)CONHCH_2$-(pyridyl) | → $(CF_3)_2CFCF(CF_3)CONHCH_2$-(pyridyl N-oxide) |
| 24 | $CF_3(CF_2)_3CONHCH_2$-(2-hexylpyridyl) | → $CF_3(CF_2)_3CONHCH_2$-(2-hexylpyridyl N-oxide) |
| 25 | $(CF_3)_2CFCF_2CONHCH(CH_3)(CH_2)_3N(C_2H_5)_2$ | → $(CF_3)_2CFCF_2CONHCH(CH_3)(CH_2)_3\overset{\downarrow O}{N}(C_2H_5)_2$ |
| 26 | $CF_3(CF_2)_4CON(CH_3)(CH_2)$-(pyridyl) | → $CF_3(CF_2)_4CON(CH_3)(CH_2)$-(pyridyl N-oxide) |
| 27 | $CF_3(CF_2)_6CON[CH(CH_3)_2](CH_2)_2$-(pyridyl) | → $CF_3(CF_2)_6CON[CH(CH_3)_2](CH_2)_2$-(pyridyl N-oxide) |
| 28 | $CF_3(CF_2)_8CON(C_2H_5)(CH_2)_2N(C_2H_5)_2$ | → $CF_3(CF_2)_8CON(C_2H_5)(CH_2)_2\overset{\downarrow O}{N}(C_2H_5)_2$ |
| 29 | $CF_3(CF_2)_9CONH(CH_2)_6N(C_3H_7)_2$ | → $CF_3(CF_2)_9CONH(CH_2)_6\overset{\downarrow O}{N}(C_3H_7)_2$ |
| 30 | $CF_3(CF_2)_{10}CONH$-(quinolinyl) | → $CF_3(CF_2)_{10}CONH$-(quinolinyl N-oxide) |
| 31 | $CF_3(CF_2)_{12}CONH(CH_2)_4N$(piperidinyl ring with $(CH_2)_5$) | → $CF_3(CF_2)_{12}CONH(CH_2)_4\overset{\downarrow O}{N}$(piperidinyl ring with $(CH_2)_5$) |

TABLE V—Continued

| Example | Amidoamine Reactant | Amidoamine Oxide Product |
|---|---|---|
| 32 | $CF_3(CF_2)_{12}CONH$-[pyridine]-$OCH_3$ | $CF_3(CF_2)_{12}CONH$-[pyridine N-oxide]-$OCH_3$ |
| 33 | $CF_3(CF_2)_{14}CONH$-[pyridine with Br, Br] | $CF_3(CF_2)_{14}CONH$-[pyridine N-oxide with Br, Br] |
| 34 | $CF_3(CF_2)_{16}CONH(CH_2)_2N[(CH_2)_2]_2O$ (morpholine) | $CF_3(CF_2)_{16}CONH(CH_2)_2N^{\rightarrow O}[(CH_2)_2]_2O$ |
| 35 | $CF_3(CF_2)_{20}CONH(CH_2)_2N[(CH_2)_4]$ (pyrrolidine) | $CF_3(CF_2)_{20}CONH(CH_2)_2N^{\rightarrow O}[(CH_2)_4]$ |
| 36 | $CF_3(CF_2)_{22}CONHCH_2CH(CH_3)CH_2N(C_2H_5)_2$ | $CF_3(CF_2)_{22}CONHCH_2CH(CH_3)CH_2N(C_2H_5)_2 \rightarrow O$ |
| 37 | $CF_3(CF_2)_{24}CONHCH_2$-[pyridine with Cl, Cl] | $CF_3(CF_2)_{24}CONHCH_2$-[pyridine N-oxide with Cl, Cl] |
| 38 | $(CF_3)_2CFO(CF_2)_6CONH(CH_2)_2$-[quinoline]-$OCH(CH_3)_2$ | $(CF_3)_2CFO(CF_2)_6CONH(CH_2)_2$-[quinoline N-oxide]-$OCH(CH_3)_2$ |
| 39 | $(CF_3)_2CFO(CF_2)_{40}CON(CH_3)$-[quinoline]-$CH_3$ | $(CF_3)_2CFO(CF_2)_{40}CON(CH_3)$-[quinoline N-oxide]-$CH_3$ |
| 40 | $(CF_3)_2CFO(CF_2)_4(CH_2)_2CONH$-[quinoline-Br] | $(CF_3)_2CFO(CF_2)_4(CH_2)_2CONH$-[quinoline N-oxide-Br] |
| 41 | $(CF_3)_2CFO(CF_2)_6(CH_2)_2CONH$-[pyridine-Cl] | $(CF_3)_2CFO(CF_2)_6(CH_2)_2CONH$-[pyridine N-oxide-Cl] |
| 42 | $(CF_3)_2CFO(CF_2)_{16}CONH$-[pyridine-Cl] | $(CF_3)_2CFO(CF_2)_{16}CONH$-[pyridine N-oxide-Cl] |
| 43 | $(CF_3)_2CFO(CF_2)_6(CH_2)_{14}CONH$-[quinoline-Cl] | $(CF_3)_2CFO(CF_2)_6(CH_2)_{14}CONH$-[quinoline N-oxide-Cl] |
| 44 | $(CF_3)_2CFO(CF_2)_2[(CH_2)_3(CF_2)_5]_3CONH(CH_2)_3N[(CH_2)_2OH]_2$ | $(CF_3)_2CFO(CF_2)_2[(CH_2)_3(CF_2)_5]_3CONH(CH_2)_3N^{\rightarrow O}[(CH_2)_2OH]_2$ |
| 45 | $(CF_3)_2CFO(CF_2)_2(CH_2)_{10}CONH(CH_2)_6$-[quinoline] | $(CF_3)_2CFO(CF_2)_2(CH_2)_{10}CONH(CH_2)_6$-[quinoline N-oxide] |
| 46 | $(CF_3)_2CFO(CF_2)_6(CH_2)_3CONHCH_2N(CH_3)_2$ | $(CF_3)_2CFO(CF_2)_6(CH_2)_3CONHCH_2N(CH_3)_2 \rightarrow O$ |
| 47 | $(CF_3)_2CFO(CF_2)_2CH_2CONHCH_2N(C_2H_5)_2$ | $(CF_3)_2CFO(CF_2)_2CH_2CONHCH_2N(C_2H_5)_2 \rightarrow O$ |
| 48 | $(CF_3)_2CFOCF_2CH_2CONH(CH_2)_3N(CH_3)_2$ | $(CF_3)_2CFOCF_2CH_2CONH(CH_2)_3N(CH_3)_2 \rightarrow O$ |

TABLE V—Continued

| Example | Amidoamine Reactant | Amidoamine Oxide Product |
|---|---|---|
| 49 | $(CF_3)_2CFO(CF_2)_2(CH_2)_3CONHCH_2\overset{CH_3}{\underset{}{N}}C_2H_5$ | $(CF_3)_2CFO(CF_2)_2(CH_2)_3CONHCH_2\overset{CH_3}{\underset{\downarrow O}{N}}C_2H_5$ |
| 50 | $(CF_3)_2CFOCF_2(CH_2CF_2)_{20}CONH(CH_2)_2N[(CH_2)_2OH]_2$ | $(CF_3)_2CFOCF_2(CH_2CF_2)_{20}CONH(CH_2)_2\underset{\downarrow O}{N}[(CH_2)_2OH]_2$ |
| 51 | $(CF_3)_2CFO(CF_2)_{20}(CH_2)_{20}CONHCH_2N(CH_2)_5$ | $(CF_3)_2CFO(CF_2)_{20}(CH_2)_{20}CONHCH_2\underset{\downarrow O}{N}(CH_2)_5$ |
| 52 | $(CF_3)_2CFOCF_2(CH_2)_2(CF_2)_{20}CONHCH_2N\!\!<\!\!(CH_2)_4$ | $(CF_3)_2CFOCF_2(CH_2)_2(CF_2)_{20}CONHCH_2\underset{\downarrow O}{N}\!\!<\!\!(CH_2)_4$ |
| 53 | $(CF_3)_2CFO(CF_2)_8[(CH_2)_4(CF_2)_4]_4CONHCH_2N\!\!<\!\!\overset{(CH_2)_2}{\underset{(CH_2)_2}{}}\!\!O$ | $(CF_3)_2CFO(CF_2)_8[(CH_2)_4(CF_2)_4]_4CONHCH_2\underset{\downarrow O}{N}\!\!<\!\!\overset{(CH_2)_2}{\underset{(CH_2)_2}{}}\!\!O$ |
| 54 | $(CF_3)_2CFO(CF_2)_4[CH_2(CF_2)_3]_9CONH(CH_2)_3N(CH_3)_2$ | $(CF_3)_2CFO(CF_2)_4[CH_2(CF_2)_3]_9CONH(CH_2)_3\underset{\downarrow O}{N}(CH_3)_2$ |
| 55 | $(CF_3)_2CFO(CF_2)_3[(CH_2)_3(CF_2)_7]CONH(CH_2)_5N(C_2H_5)_2$ | $(CF_3)_2CFO(CF_2)_3[(CH_2)_3(CF_2)_7]CONH(CH_2)_5\underset{\downarrow O}{N}(C_2H_5)_2$ |
| 56 | $\overset{CF_3}{\underset{C_2F_5}{F\overset{|}{C}O}}(CF_2)_3[(CH_2)_5(CF_2)_3]_2CONH(CH_2)_3N\!\!<\!\!\overset{(CH_2)_2}{\underset{(CH_2)_2}{}}\!\!O$ | $\overset{CF_3}{\underset{C_2F_5}{F\overset{|}{C}O}}(CF_2)_3[(CH_2)_5(CF_2)_3]_2CONH(CH_2)_3\underset{\downarrow O}{N}\!\!<\!\!\overset{(CH_2)_2}{\underset{(CH_2)_2}{}}\!\!O$ |
| 57 | $\overset{F(CF_2)_3}{\underset{F(CF_2)_4}{F\overset{|}{C}O}}(CF_2)_{17}CON\overset{(CH_2)_4N[(CH_2)_2OH]_2}{\underset{(CH_2)_5CH_3}{}}$ | $\overset{F(CF_2)_3}{\underset{F(CF_2)_4}{F\overset{|}{C}O}}(CF_2)_{17}CON\overset{(CH_2)_4\underset{\downarrow O}{N}[(CH_2)_2OH]_2}{\underset{(CH_2)_5CH_3}{}}$ |
| 58 | $\overset{F_2CCl}{\underset{F_2CCl}{F\overset{|}{C}O}}(CH_2)_8CONH(CH_2)_2N\!\!<\!\!(CH_2)_4$ | $\overset{F_2CCl}{\underset{F_2CCl}{F\overset{|}{C}O}}(CH_2)_8CONH(CH_2)_2\underset{\downarrow O}{N}\!\!<\!\!(CH_2)_4$ |
| 59 | $\overset{CF_3}{\underset{\underset{CF_3}{FCCl}}{\overset{FCCl}{\overset{|}{C}FO}}}(CF_2)_{10}CONH(CH_2)_2N\!\!<\!\!(CH_2)_5$ | $\overset{CF_3}{\underset{\underset{CF_3}{FCCl}}{\overset{FCCl}{\overset{|}{C}FO}}}(CF_2)_{10}CONH(CH_2)_2\underset{\downarrow O}{N}\!\!<\!\!(CH_2)_5$ |
| 60 | $\overset{(CF_2)_9CF_3}{\underset{(CF_2)_9CF_3}{F\overset{|}{C}O}}(CF_2)_3CONH(CH_2)_2N(CH_3)_2$ | $\overset{(CF_2)_9CF_3}{\underset{(CF_2)_9CF_3}{F\overset{|}{C}O}}(CF_2)_3CONH(CH_2)_2\underset{\downarrow O}{N}(CH_3)_2$ |
| 61 | $(CF_2)_2\!\!<\!\!\overset{CF_2}{\underset{CF_2}{}}\!\!FCO(CF_2)_2(CH_2)_2CONH(CH_2)_3N(CH_3)_2$ | $(CF_2)_2\!\!<\!\!\overset{CF_2}{\underset{CF_2}{}}\!\!FCO(CF_2)_2(CH_2)_2CONH(CH_2)_3\underset{\downarrow O}{N}(CH_3)_2$ |
| 62 | $(CF_2)_3\!\!<\!\!\overset{CF_2}{\underset{CF_2}{}}\!\!FCO(CF_2)_3CONH(CH_2)_3N(CH_3)_2$ | $(CF_2)_3\!\!<\!\!\overset{CF_2}{\underset{CF_2}{}}\!\!FCO(CF_2)_3CONH(CH_2)_3\underset{\downarrow O}{N}(CH_3)_2$ |
| 63 | $\overset{(CF_3)_2CF}{\underset{FCCl_2}{F\overset{|}{C}O}}(CF_2)_5CONH(CH_2)_3N(CH_3)_2$ | $\overset{(CF_3)_2CF}{\underset{FCCl_2}{F\overset{|}{C}O}}(CF_2)_5CONH(CH_2)_3\underset{\downarrow O}{N}(CH_3)_2$ |
| 64 | $\overset{CF_3(CF_2)_5CF_2}{\underset{(CF_3)_3CCF_2}{F\overset{|}{C}O}}(CF_2)_7CONH(CH_2)_3N(CH_3)_2$ | $\overset{CF_3(CF_2)_5CF_2}{\underset{(CF_3)_3CCF_2}{F\overset{|}{C}O}}(CF_2)_7CONH(CH_2)_3\underset{\downarrow O}{N}(CH_3)_2$ |
| 65 | $(CF_3)_2CFO(CF_2)_2CONH(CH_2)_3N(CH_3)_2$ | $(CF_3)_2CFO(CF_2)_2CONH(CH_2)_3\underset{\downarrow O}{N}(CH_3)_2$ |
| 66 | $(CF_3)_2CFO(CF_2)_5CONH(CH_2)_3N[(CH_2)_3CH_3]_2$ | $(CF_3)_2CFO(CF_2)_5CONH(CH_2)_3\underset{\downarrow O}{N}[(CH_2)_3CH_3]_2$ |

We claim:
1. Amidoamine oxides of the formula:

$$R_fCON-RQ$$
$$\phantom{R_fCON-}|$$
$$\phantom{R_fCON-}Y$$

wherein $R_f$ is a perfluoroalkyl radical of 4 to 25 carbon atoms or a polyfluoroisoalkoxyalkyl radical of the formula:

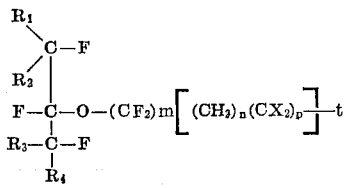

wherein $R_1$, $R_2$, $R_3$ and $R_4$ independently at each occurrence can be fluorine, perfluoroalkyl of 1 to 9 carbon atoms and provided that no more than two of the four $R_1$–$R_4$ groups are perfluoroalkyl groups; $m$ is an integer 3 to 40; $n$, $p$ and $t$ are each integers 0 to 20, the sum of $m$ and $t$ ($n+p$) being 3 to 41, with the proviso that when $n$ is odd, $p$ is odd, and when $n$ is even, $p$ is even; X is hydrogen or fluorine; Y is hydrogen or alkyl of 1 to 6 carbon atoms; R is a straight- or a branched-chain alkylene radical of the formula $$-C_zH_{2z}-$$

wherein $z$ is an integer of 1 to 6; and Q is an aliphatic amine oxide radical of the formula:

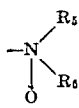

wherein $R_5$ and $R_6$ are each alkyl radicals of 1 to 6 carbon atoms or hydroxy-terminated alkyl radicals of 2 to 6 carbon atoms.

2. Amidoamine oxides as claimed in claim 1 wherein $R_1$, $R_2$, $R_3$ and $R_4$ are each fluorine or a perfluoroalkyl group of 1 to 6 carbon atoms, $m$ is an integer 3 to 10 and $n$, $p$ and $t$ are zero.

3. Amidoamine oxides as claimed in claim 2 wherein $R_1$ and $R_2$ are each fluorine and $m$ is an integer 3 to 10.

4. Amidoamine oxides as claimed in claim 1 wherein Y is hydrogen.

5. An amidoamine oxide as claimed in claim 1 having the formula:

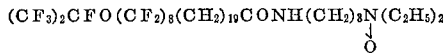

6. An amidoamine oxide as claimed in claim 1 having the formula:

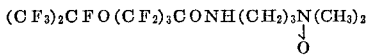

7. An amidoamine oxide as claimed in claim 1 having the formula:

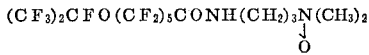

8. An amidoamine oxide as claimed in claim 1 having the formula:

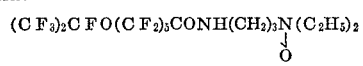

9. An amidoamine oxide as claimed in claim 1 having the formula:

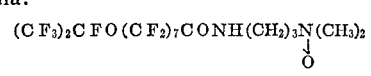

10. An amidoamine oxide as claimed in claim 1 having the formula:

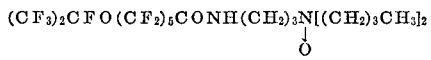

References Cited
UNITED STATES PATENTS

| | | | |
|---|---|---|---|
| 3,577,447 | 5/1971 | Sweeney et al. | 260—404.5 |
| 3,547,995 | 12/1970 | Bartlett | 260—561 HL |
| 3,600,415 | 8/1971 | Sweeney et al. | 260—404.5 |
| 3,655,555 | 4/1972 | Rossmy et al. | 252—3 |

LEWIS GOTTS, Primary Examiner

E. G. LOVE, Assistant Examiner

U.S. Cl. X.R.

252—3; 260—247.2 A, 287 R, 293.88, 295 AM, 326.8, 501.13, 501.15, 534 M, 535 H, 561 HL, 950; 424—320

UNITED STATES PATENT OFFICE
CERTIFICATE OF CORRECTION

Patent No. 3,828,085   Dated August 6, 1974

Inventor(s) Alson K. Price and Abraham N. Fenster

It is certified that error appears in the above-identified patent and that said Letters Patent are hereby corrected as shown below:

Column 6, line 19, "Halides," should be -- Halides," --.

Column 6, line 64, after "in", insert -- converting the aforementioned telomer iodides to the --.

Column 7, line 1, "Derivatives," " should be --Derivatives", --.

Column 7, line 18, "Fluoroolefins,""should be --Fluoroolefins", --.

Column 8, line 67, "Compounds," " should be -- Compounds", --.

Column 10, line 57, after "parts", insert -- , --.

Column 10, line 71, "part" should be -- parts --.

Column 11, first formula, "$CF_3(CF_2)_3\overset{O}{\underset{}{C}}-NH(CH_2)_3\overset{O}{\underset{}{N}}(CH_3)$" should be -- $CF_3(CF_2)_5\overset{O}{\underset{}{C}}NH(CH_2)_3\overset{}{N}(CH_3)_2$ --.

Column 11, second formula, "$(CF_3)_2CFO(CF_2)_3\overset{O}{\underset{}{C}}NH(CH_2)_3N(CH_3)_2$" should be -- $(CF_3)_2CFO(CF_2)_3\overset{O}{\underset{}{C}}-NH(CH_2)_3N(CH_3)_2$ --.

UNITED STATES PATENT OFFICE
CERTIFICATE OF CORRECTION

Page 2

Patent No. 3,828,085              Dated August 6, 1974

Inventor(s) Alson K. Price and Abraham N. Fenster

It is certified that error appears in the above-identified patent and that said Letters Patent are hereby corrected as shown below:

Column 11, third formula, "$(CF_3)_2CFO(CF_2)_3\overset{O}{\underset{\|}{C}}NH(CH_2)_3\overset{O}{\underset{\|}{C}}(CH_3)_2$"

should be -- $(CF_3)_2CFO(CF_2)_3\overset{O}{\underset{\|}{C}}NH(CH_2)_3\overset{O}{\underset{\|}{N}}(CH_3)_2$ --.

Column 13, line 56, after "WSR-35", delete -- , --.

Columns 15 and 16, Table IV, first formula

"$(CF_3)_2CFO(CF_2)_5CONH(CH_2)_3\overset{\oplus}{N}(CH_2CH_3)_2\underset{|}{\overset{CH_2CH_2COO^\ominus}{}}$ " should be -- $(CF_3)_2CFO(CF_2)_5CCNH(CH_2)_3\underset{\oplus}{N}(CH_2CH_3)_2\underset{|}{\overset{CH_2CH_2COO^\ominus}{}}$ -- .

Columns 15 and 16, Table IV, third formula

"$(CF_3)_2CFO(CF_2)_2(CH_2)\oplus_2N\bigcirc I\ominus$ " should be

-- $(CF_3)_2CFO(CF_2)_2(CH_2)\overset{\oplus}{\underset{2}{}}N\bigcirc I\ominus$ --.

Columns 15 and 16, Table IV, fourth formula

"$(CF_3)_2CFO(CF_2)_5CONH(CH_2)3+N(CH_3)_2\underset{|}{\overset{CH_2CH_2COO^\ominus}{}}\underset{|}{CH_2CH_2COO^\ominus}$ " should be -- $(CF_3)_2CFO(CF_2)_5CONH(CH_2)_3\underset{\oplus}{N}(CH_3)_2$ --.

UNITED STATES PATENT OFFICE
CERTIFICATE OF CORRECTION

Page 3

Patent No. 3,828,085    Dated August 6, 1974

Inventor(s) Alson K. Price and Abraham N. Fenster

It is certified that error appears in the above-identified patent and that said Letters Patent are hereby corrected as shown below:

Columns 15 and 16, Table IV, fifth formula

" 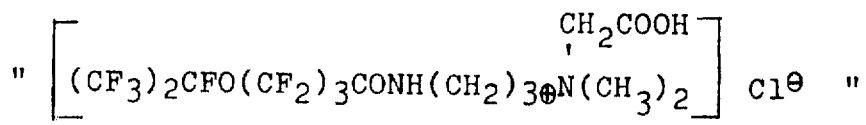 "

should read

-- 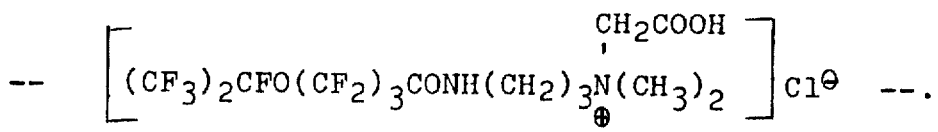 --.

UNITED STATES PATENT OFFICE
CERTIFICATE OF CORRECTION

Page 4

Patent No. 3,828,085      Dated August 6, 1974

Inventor(s) Alson K. Price and Abraham N. Fenster

It is certified that error appears in the above-identified patent and that said Letters Patent are hereby corrected as shown below:

Column 15, line 63, "Todd-Sanford," Clinical" should be -- Todd-Sanford, "Clinical --.

Column 15, line 67, "elevent" should be -- eleven --.

Columns 17 and 18, Example 29, the first part of the formula

"$CF_3(CF_2)_9CONH(CH_2)_6N(C_2H_7)_2$" should be

-- $CF_3(CF_2)_9CONH(CH_2)_6N(C_3H_7)_2$ --.

Columns 21 and 22, Example 51,

"$(CF_3)_2CFO(CF_2)_{20}(CH_2)_{20}CONHCH_2N(CH_2)_5 \longrightarrow$ $(CF_3)_2CFO(CF_2)_{20}(CH_2)_{20}CONHCH_2\underset{O}{N}(CH_2)_5$" should be -- $(CF_3)_2CFO(CF_2)_{20}(CH_2)_{20}CONHCH_2N\overset{\frown}{\underset{\smile}{\phantom{xx}}}(CH_2)_5 \longrightarrow$ $(CF_3)_2CFO(CF_2)_{20}(CH_2)_{20}CONHCH_2\underset{O}{N}\overset{\frown}{\underset{\smile}{\phantom{xx}}}(CH_2)_5$ --.

Columns 21 and 22, Example 56, the second part of the formula,

"$\longrightarrow \underset{C_2F_5}{\overset{CF_3}{FCO(CF_2)_3[(CH_2)_5(CF_2)]_2CONH(CH_2)_3\underset{O}{N}}} \genfrac{}{}{0pt}{}{(CH_2)_2}{(CH_2)_2} \hspace{-2pt}\diagdown\hspace{-4pt}\diagup O$"

should be

UNITED STATES PATENT OFFICE
CERTIFICATE OF CORRECTION

Page 5

Patent No. 3,828,085  Dated August 6, 1974

Inventor(s) Alson K. Price and Abraham N. Fenster

It is certified that error appears in the above-identified patent and that said Letters Patent are hereby corrected as shown below:

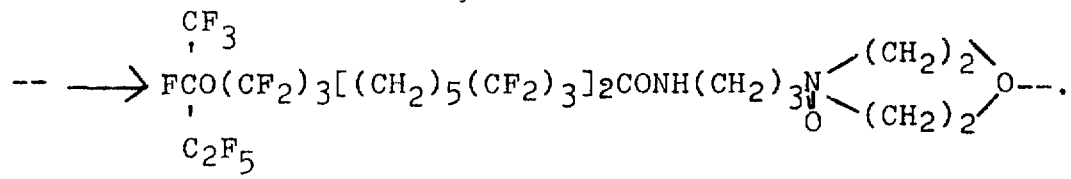

Columns 21 and 22, Example 59, in the second part of the formula

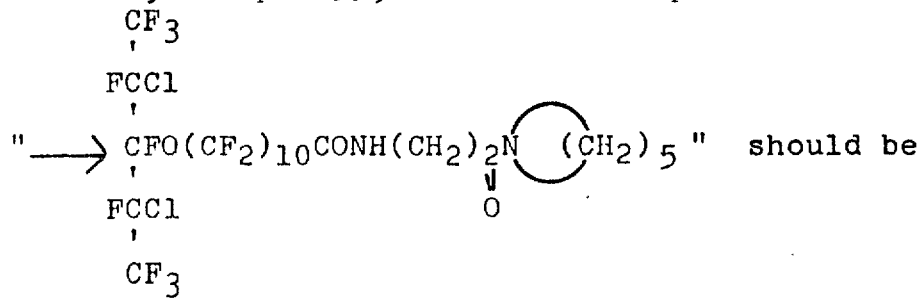 should be

UNITED STATES PATENT OFFICE
CERTIFICATE OF CORRECTION

Patent No. 3,828,085    Dated August 6, 1974

Inventor(s) Alson K. Price and Abraham N. Fenster

It is certified that error appears in the above-identified patent and that said Letters Patent are hereby corrected as shown below:

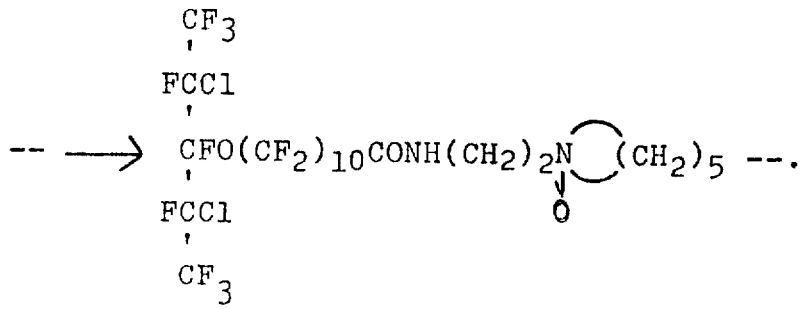

Columns 21 and 22, Example 60, in the first part of the formula, the part which reads

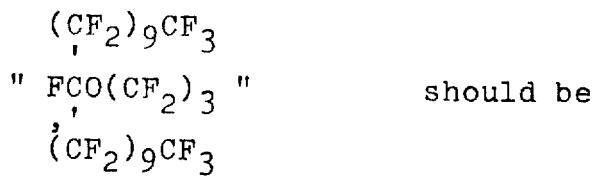   should be

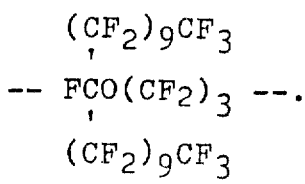

Column 24, claim 5, the formula

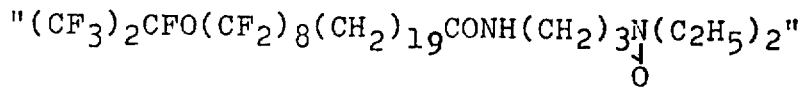

should read

UNITED STATES PATENT OFFICE
CERTIFICATE OF CORRECTION

Patent No. 3,828,085　　　　　　Dated August 6, 1974

Inventor(s) Alson K. Price and Abraham N. Fenster

It is certified that error appears in the above-identified patent and that said Letters Patent are hereby corrected as shown below:

$$-- (CF_3)_2CFO(CF_2)_8(CH_2)_{10}CONH(CH_2)_3\underset{\underset{O}{\downarrow}}{N}(C_2H_5)_2 --.$$

Signed and sealed this 1st day of April 1975.

(SEAL)
Attest:

RUTH C. MASON　　　　　　C. MARSHALL DANN
Attesting Officer　　　　Commissioner of Patents
　　　　　　　　　　　　　　and Trademarks